United States Patent
Brinkman

(10) Patent No.: US 6,730,738 B2
(45) Date of Patent: May 4, 2004

(54) HOT-MELT ADHESIVE

(75) Inventor: Larry Frank Brinkman, Woodstock, IL (US)

(73) Assignee: Rohm and Haas Company, Philadelphia, PA (US)

(*) Notice: Subject to any disclaimer, the term of this patent is extended or adjusted under 35 U.S.C. 154(b) by 0 days.

(21) Appl. No.: 10/310,081

(22) Filed: Dec. 4, 2002

(65) Prior Publication Data

US 2003/0106640 A1 Jun. 12, 2003

Related U.S. Application Data

(60) Provisional application No. 60/337,065, filed on Dec. 6, 2001.

(51) Int. Cl.⁷ ................................................. C08G 18/10
(52) U.S. Cl. ..................................... 525/131; 156/331.4
(58) Field of Search ......................... 525/131; 156/331.4

(56) References Cited

U.S. PATENT DOCUMENTS

| | | |
|---|---|---|
| 4,985,535 A | 1/1991 | Takada et al. |
| 5,155,180 A | 10/1992 | Takada et al. |
| 5,965,662 A | 10/1999 | Krebs et al. |
| 6,136,136 A | 10/2000 | Heider et al. |
| 6,248,856 B1 | 6/2001 | Sarpeshkar et al. |
| 6,579,406 B2 * | 6/2003 | Brinkman ................ 156/331.4 |
| 2002/0033228 A1 | 3/2002 | Brinkman |

FOREIGN PATENT DOCUMENTS

| | | |
|---|---|---|
| EP | 1153997 | 11/2001 |
| WO | 99/32569 | 7/1991 |

* cited by examiner

*Primary Examiner*—Rachel Gorr
(74) *Attorney, Agent, or Firm*—Carl P. Hemenway

(57) ABSTRACT

A moisture-reactive hot-melt adhesive composition is provided. Particularly, a composition that includes a polyether polyol, a polyester polyol, a styrene/allyl alcohol copolymer, and a polyisocyanate. More particularly, the components are chosen so that the ratio of NCO/OH groups on an equivalents basis is from 1.8/1 to 3.0/1; the components contain less than 1% by weight of water; the weight ratio of polyether polyol to polyester polyol is at least 0.42; and the free NCO content is at least 5.5% by weight. Also provided are a method for forming the adhesive composition and a method for bonding substrates using the adhesive.

9 Claims, No Drawings

HOT-MELT ADHESIVE

CROSS REFERENCE TO RELATED PATENT APPLICATIONS

This is a non-provisional application of prior pending U.S. provisional application Ser. No. 60/337,065 filed Dec. 6, 2001.

This invention relates to a hot-melt adhesive, particularly a moisture-reactive hot-melt adhesive composition, a method for forming the adhesive composition, and a method for bonding substrates, such as structural components, using the adhesive composition. More particularly, this invention relates to a hot-melt adhesive composition formed by admixing a polyether polyol, a polyester polyol, a styrene/allyl alcohol copolymer, and a polyisocyanate, with the ingredients adjusted in specified ways to give the desired balance of properties.

BACKGROUND

Hot-melt adhesives are known to be desirable for their quick setting and for the absence of aqueous or solvent media which provide fluidity to other types of adhesives. Moisture-reactive hot-melt adhesives that are based on an isocyanate group-containing urethane prepolymer can be designed to yield a relatively low melt viscosity for facile handling and application; reaction with moisture augments the final properties of the adhesive. However, moisture-reactive hot-melt adhesives may not be adequate at resistance to slow deformation when subjected to sustained stress over time (such resistance is known in the art as "creep resistance").

U.S. patent application Ser. No. 09/84,3706 discloses moisture-reactive hot-melt adhesives that incorporate styrene/allyl alcohol addition copolymers into a polyurethane prepolymer-forming reaction mixture containing amorphous polyesters or polyethers. These adhesives achieve good "green strength" (ie, adhesive strength prior to completion of the reaction with moisture), but they may not give sufficient creep resistance for some uses.

The problem faced by the inventor is the provision of an alternative moisture-reactive hot-melt adhesive composition with improved creep resistance that also has good adhesion to substrates. Surprisingly, it has been found that incorporation of styrene/allyl alcohol copolymer in certain compositions with sufficiently high levels of free NCO groups provided the desired balance of properties.

STATEMENT OF THE INVENTION

In a first aspect of the present invention, there is provided a moisture-reactive hot-melt adhesive composition formed by admixing components comprising a polyether polyol, a polyester polyol, a styrene/allyl alcohol copolymer, and a polyisocyanate; wherein the ratio of NCO/OH groups of said components on an equivalents basis is from 1.8/1 to 3.0/1; wherein said components contain less than 1%, by weight based on the total weight of said components, water; and wherein the free NCO content of said components is at least 4%, based on the total weight of said components.

In a second aspect of the present invention, there is provided a method for forming a moisture-reactive hot-melt adhesive comprising admixing components comprising a polyether polyol, a polyester polyol, a styrene/allyl alcohol copolymer, and a polyisocyanate; wherein the ratio of NCO/OH groups of said components on an equivalents basis is from 1.8/1 to 3.0/1; wherein said components contain less than 1%, by weight based on the total weight of said components, water; and wherein the free NCO content of said components is at least 4%, based on the total weight of said components.

In a third aspect of the present invention, there is provided a method for bonding substrates comprising
(a) forming a moisture-reactive hot-melt adhesive by admixing components comprising a polyether polyol, a polyester polyol, a styrene/allyl alcohol copolymer, and a polyisocyanate; wherein the ratio of NCO/OH groups of said components on an equivalents basis is from 1.8/1 to 3.0/1; wherein said components contain less than 1%, by weight based on the total weight of said components, water; and wherein the free NCO content of said components is at least 4%, based on the total weight of said components;
(b) heating said hot-melt adhesive;
(c) applying said heated hot-melt adhesive to a first substrate in the presence of moisture;
(d) contacting said applied heated hot-melt adhesive with a second substrate; and
(e) cooling, or allowing to cool, said hot-melt adhesive.

DETAILED DESCRIPTION

The composition of this invention is a moisture-reactive hot-melt adhesive composition. By "moisture-reactive" is meant herein that the composition contains isocyanate groups which are capable of reacting is with water desirably to effect an increase in the molecular weight of the adhesive composition and/or effect crosslinking of the adhesive composition so as to increase the strength properties of the adhesive subsequent to being contacted with water. By "hot-melt" is meant herein that the adhesive which may be a solid, semi-solid, or viscous mass can be advantageously heated to provide a fluid adhesive of a viscosity suitable for application to and adhesion to substrates.

The moisture-reactive hot-melt adhesive composition of the present invention is formed by admixing components which include a polyisocyanate, ie., an isocyanate bearing at least two isocyanate groups. Polyisocyanates which may be used include aromatic, aliphatic, cycloaliphatic polyisocyanates and combinations thereof, such as, for example, m-phenylene diisocyanate, 2,4-toluene diisocyanate, 2,6-toluene diisocyanate, hexamethylene diisocyanate, tetramethylene diisocyanate, 1,4-cyclohexane diisocyanate, hexahydrotoluene diisocyanate, 1,5-naphthalene diisocyanate, 1-methoxy-2,4-phenylene diisocyanate, 4,4'-diphenylmethane diisocyanate, 2,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate, 3,3'-dimethyl-4,4'-diphenylmethane diisocyanate, isophorone diisocyanate, 4,4',4"-triphenylmethane triisocyanate, polymethylene polyphenylene polyisocyanate, 2,4,6-toluene triisocyanate, 4,4'-dimethyl-diphenylmethane tetraisocyanate, prepolymers having Mn less than 2000 and bearing at least two isocyanate groups, and mixtures thereof. Preferred are 4,4'-diphenylmethane diisocyanate, 2,4'-diphenylmethane diisocyanate, and mixtures thereof; more preferred is 4,4'-diphenylmethane diisocyanate.

The moisture-reactive hot-melt adhesive composition of the present invention is formed by admixing components which include a polyester polyol. Polyester polyols suitable for use in the present invention include those formed from diacids, or their monoester, diester, or anhydride counterparts, and diols. The diacids may be saturated $C_4$–$C_{12}$ aliphatic acids, including branched, unbranched, or cyclic materials, and/or $C_8$–$C_{15}$ aromatic acids. Examples of suitable aliphatic acids include, for example, succinic, glutaric, adipic, pimelic, suberic, azelaic, sebacic, 1,12-dodecanedioic, 1,4-cyclohexanedicarboxylic, and 2-methylpentanedioic acids. Examples of suitable aromatic acids include, for example, terephthalic, isophthalic, phthalic, 4,4'-benzophenone dicarboxylic, 4,4'-diphenylamine dicarboxylic acids, and mixtures thereof The diols may be $C_2$–$C_{12}$ branched, unbranched, or cyclic aliphatic diols. Examples of suitable diols include, for example, ethylene glycol, 1,3-propylene glycol, 1,2-propylene glycol, 1,4-butanediol, neopentyl glycol, 1,3-butanediol, hexanediols, 2-methyl-2,4-pentanediol, cyclohexane-1,4-dimethanol, 1,12-dodecanediol, and mixtures thereof. Mixtures of the various suitable polyester polyols are also suitable for use in the present invention.

In the practice of the present invention, the preferred polyester polyols are amorphous, which means that they do not crystallize under ambient conditions. The amorphous polyols preferably have a weight-average molecular weight ("Mw") as measured by gel permeation chromatography, from 250 to 8,000, more preferably from 250 to 3,000, and preferably have an acid number less than 5, more preferably less than 2. Amorphous polyester polyols are preferably aromatic such as those formed from phthalic anhydride and diethylene glycol. Amorphous polyether polyols may be prepared by the reaction of an alkylene oxide with a polyhydric alcohol. Mixtures of the various suitable amorphous polyester polyols are also suitable for use in the present invention.

The moisture-reactive hot-melt adhesive composition of the present invention is formed by admixing components which include a polyether polyol. Polyether polyols suitable for use in the present invention include polyoxy-$C_2$–$C_6$-alkylene polyols, including branched and unbranched alkylene groups. Examples of suitable polyether polyols include, for example, polyethylene oxide, poly(1,2- and 1,3-propyleneoxide), poly(1,2-butyleneoxide), random or block copolymers of ethylene oxide and 1,2-propylene oxide, and mixtures thereof. The preferred polyether polyol is polypropylene glycol. The polyether polyol preferably has a weight average molecular weight ("Mw") as measured by gel permeation chromatography, from 800 to 8,000, more preferably from 1,000 to 3,000. Mixtures of the various suitable polyether polyols are also suitable for use in the present invention.

The moisture-reactive hot-melt adhesive composition of the present invention is formed by admixing components which include a styrene/allyl alcohol addition copolymer. Preferred hydroxyl number for styrene/allyl alcohol addition copolymers is in the range 100–300. Preferred number-average molecular weight ("Mn") for styrene/allyl alcohol addition copolymers is in the range of 1,000–4,000. Such copolymers are commercially available from Lyondell Chemical, Houston, Tex. such as SAA-100, disclosed to be 70 styrene/30 allyl alcohol, on a molar basis, and SAA-103, disclosed to be 80 styrene/20 allyl alcohol, on a molar basis. By "styrene/allyl alcohol addition copolymer" herein is meant a copolymer containing at least 90 weight percent of copolymerized residues of styrene and allyl alcohol but not excluding other copolymerized monomer(s) to an extent of less than 10 weight percent based on the weight of the copolymer.

In the practice of the present invention, the ratio of NCO/OH groups from all of the admixed components taken on an equivalents basis is between 1.8/1 and 3.0/1, preferably between 1.9/1 and 2.9/1, more preferably between 2.0/1 and 2.8/1, even more preferably between 2.2/1 and 2.7/1, and most preferably between 2.3/1 and 2.4/1, in order to provide an adhesive composition with an excess of isocyanate groups.

Another useful method of characterizing the admixture of the components of the present invention is the free NCO content. The free NCO content is the weight %, based on the total weight of the admixture, of free NCO. Free NCO is the amount of NCO in excess of the amount needed to match the OH groups in the admixture on a 1:1 equivalents basis. In the practice of the present invention, suitable compositions have free NCO content of at least 4%, more preferably 5% to 20%, and most preferably 6% to 7%. Without being limited to theory, it is believed that increasing the NCO/OH ratio and the free NCO content leads to a cured adhesive composition with higher concentration of crosslinks, which in turn leads to improved creep resistance.

Yet another useful method of characterizing the admixture of components of the present invention is the ratio (herein called "polyol ratio") of the weight of polyether polyol to the weight of polyester polyol. In calculating the polyol ratio, "weight of polyether polyol" is taken to mean the sum of the weights of all polyether polyols used as components of the admixture, and "weight of polyester polyol" is taken to mean the sum of the weights of all polyester polyols used as components of the admixture. Suitable values for this mixture are 0.42 and above, preferably 0.44 to 0.70, and more preferably 0.45 to 0.60. Without being limited to theory, adjustment of the polyol ratio to within the suitable range is believed to enhance the ability of the adhesive composition to adhere to substrates.

The components of the present invention contain less than 1% water, preferably less than 0.2% water, more preferably less than 0.1%, by weight based on the total weight of the components.

The components are mixed by conventional means, preferably in an inert, dry atmosphere, and reacted, preferably at a temperature of 50° C. to 120° C., preferably for a time sufficient to achieve a hydroxyl number of less than 25, more preferably for a time sufficient to achieve a hydroxyl number of less than 5. The styrene/allyl alcohol addition copolymer is preferably solubilized by heating and mixing with at least one of the non-isocyanate containing components before the reaction is with the polyisocyanate. Optionally, a catalyst such as, for example, a tertiary amine or a tin-based catalyst may be admixed with the components, either before, during, or after the reaction to form the adhesive composition. When such an optional catalyst is used, the usual use level is less than 0.3% by weight based on the total weight of the admixed components. The adhesive composition of this invention, which is an NCO-functional adhesive, is stored, preferably under an inert, dry atmosphere until use.

The hot-melt adhesive composition may be formulated by admixing additional conventional ingredients such as fillers, pigments, tackifiers, plasticizers, rheology modifiers, thermoplastic acrylic resins, etc. with due regard to the reactivity of the NCO-functional groups, which is desirably maintained.

In some embodiments of the present invention, the components include at least one hydroxyl-functional triglyceride of one or more fatty acids. Hydroxyl-functional triglycerides of fatty acids have the chemical formula $CH_2OR^1$—$CHOR^1$—$CH_2OR^3$, where $R^1$, $R^2$, and $R^3$ are residues of fatty acids, which may be the same or different, at least one of which has hydroxyl functionality. The preferred hydroxyl-functional triglyceride of fatty acids is castor oil.

In the method for bonding substrates of the present invention, the moisture-reactive hot-melt adhesive is heated in order to achieve a viscosity suitable for transporting the adhesive, such as by pumping or gravity feed, to the application equipment and for the application of the adhesive to a first substrate in the presence of moisture. The temperature should be high enough to achieve a suitable viscosity but low enough to avoid excessive degradation or other undesirable effects on the adhesive. Typical useful temperatures are in the range of 40° C. to 200° C., preferably 50° C. to 160° C., and more preferably 100° C. to 150° C. The application of the adhesive may be effected by conventional means such as, for example, heated spray applicator, heated bead applicator, heated nozzle, and heated roll coater, to form a continuous or discontinuous film of adhesive, as desired. The adhesive may typically be applied at a level of 50 to 250 g/sq. meter (4–20 g/sq ft) although in cases where one of the substrates is a fabric it may be applied at a level as low as 1–50 g/sq. meter. It is contemplated that the moisture, ie., water, which is anticipated to effect reaction with the NCO-functional groups thereby increasing the ultimate cohesive strength of the applied adhesive, may be, for example, a result of ambient humidity, artificially increased or controlled humidified air, a mist of water droplets, or a spray of liquid water contacting the applied adhesive. It is further contemplated that the moisture may be augmented by other NCO-functional group-reactive ingredients such as, for example, amines.

Then, the applied adhesive is contacted by a second substrate to provide a composite construction. The composite construction so formed is optionally subjected to applied pressure such as by passing it between rollers to effect increased contact of the substrates with the adhesive and the composite construction is then cooled or allowed to cool. In another embodiment the adhesive may be simultaneously or sequentially applied to two surfaces of the first substrate, which adhesive-coated surfaces are then simultaneously or sequentially bonded to two further substrates, which may be the same or different. It is further contemplated that the composite construction may subsequently be bonded to other substrate(s) using the same or a different adhesive before or after the process described herein. The first and second substrates to be bonded in the method of this invention may be the same or different and include, for example, metal, wood, consolidated wood products, paper, woven and nonwoven fabrics, and plastics which may have smooth or structured surfaces and are provided in the form of rolls, sheets, films, foils, etc. They include, for example, lauan mahogany plywood, impregnated paper, extruded polystyrene foam, expanded polystyrene foam, fiberglass reinforced polyester, polyester fabric, high or low pressure laminate, plywood, aluminum, steel, PVC, and engineering plastics.

In some embodiments of the present invention, the substrates that are bonded are relatively thin and flat, and in such cases the composite article is a called a laminate or laminated structure.

The following examples are presented to illustrate the invention and the results obtained by the test procedures.

Abbreviations

MDI=diphenylmethane diisocyanate
DEG-PA=diethyleneglycol-phthalic anhydride
PPG=polypropylene glycol Test Procedures
Preparation of test specimens:
Specimens are sandwich laminates of oriented strand board (OSB), adhesive, expanded polystyrene foam, adhesive, and OSB, prepared according to procedures published by the International Conference of Building Officials (ICBO), in "Acceptance Criteria For Sandwich Panel Adhesives," #AC05.

Hand Failure:
A sandwich laminate specimen is cut to width of approximately 5 to 7.5 cm (2 to 3 inches). One piece of OSB is secured, and force is exerted by hand on the other piece of OSB until the sandwich comes apart, and the failure mode is observed. The "pass" failure mode is for the polystyrene foam to separate. The "fail" failure mode is adhesive failure of the adhesive at any of the bonding surfaces.

Creep:
Following ICBO procedure AC05 section 8.6.1, sandwich specimens are subjected to stress of 345 kilopascal (50 psi), and the deformation is observed. "Pass" performance requires average deformation of less than 0.002 cm per cm (0.002 inch per inch) in the first hour and average deformation of less than 0.005 cm per cm (0.005 inch per inch) for the duration of the test. Samples are tested according to section 8.6.3, at 70° C. (158° F.) for one week.

EXAMPLES

Example 1

Preparation of Hot Melt Adhesive Composition of the Invention

A one liter reaction vessel was set up with, a gas inlet tube, thermometer, stirrer and a heating jacket. 60. 1 g 80/20 styrene/allyl alcohol (molar ratios) copolymer (Mn approximately 3200; hydroxyl number approximately 125) (Lyondell Chemicals SAA-103), 96.1 g. PPG 1025 (Mw approximately 1,000) (BASF Corp.), and 18 g. castor oil (Caschem) were added to the reaction vessel and the temperature raised to 110° C. with stirring. After 30 minutes at 110° C. and a vacuum of 711 mm (28 inches) of mercury, the temperature was lowered to 80° C. 186.2 g of 4,4'-MDI (BASF Corp.) was added and the temperature was held at 80–100° C. for one hour with stirring and under 711 mm (28 inches) of mercury. 240.3 g. of DEG-PA polyester (hydroxyl number approximately 56 and Mw approximately 2,000) (Stepanpol™ PD-56, Stepan Chemical) was added and the reaction temperature was held at 80-100° C. for an additional hour with stirring under vacuum of 711 mm of mercury (28 inches of mercury). At this time the reaction product was poured from the vessel hot, into a container which was then blanketed in dry nitrogen and sealed.

Using this adhesive composition, several sandwich laminate 20 samples were prepared.

Example 2

Preparation of Hot Melt Adhesive Composition of the Invention

Using the methods of Example 1, an adhesive composition was made with components as follows:

| Ingredient | Parts by Weight |
| --- | --- |
| SAA 103 | 10.0 |
| PPG 1025 | 17.5 |
| Castor Oil | 3.0 |
| 4,4'-MDI | 31.5 |
| PD 56 | 38.0 |

Using this adhesive composition, several sandwich laminate samples were prepared.

Comparative A

Preparation of Comparative Hot Melt Adhesive Composition

Using the methods of Example 1, an adhesive composition was made with components as follows:

| Ingredient | Parts by Weight |
| --- | --- |
| SAA 103 | 2.0 |
| PPG 1025 | 22.0 |
| Castor Oil | 9.0 |
| 4,4'-MDI | 26.0 |
| PD56 | 41.0 |

Using this adhesive composition, several sandwich laminate samples were prepared.

Example 3

Results of Creep Testing of the Samples

Some of the samples from each adhesive composition were tested by the Creep test, and the average results follow:

| Sample | NCO/OH | Free NCO Content | Creep |
| --- | --- | --- | --- |
| Sample 1 | 2.38/1 | 6.08% | pass |
| Comparative A | 1.75/1 | 3.75% | fail |

The Comparative sample, with low NCO/OH ratio and low free NCO content, failed the creep test, while Sample 1, which embodies the present invention, passed the creep test.

Example 4

Further Creep

The NCO/OH ratio of Sample 2 was 2.39/1, and the free NCO content was 6.20%. A sandwich laminate sample is prepared using Sample 2 as the adhesive, and it passes the creep test.

Example 5

Further Improvement in Properties

Samples from each adhesive composition were tested by the Hand Failure test, and the results follow:

| Sample | Polyol Ratio | Hand Failure |
| --- | --- | --- |
| Sample 1 | 0.40 | fail |
| Sample 2 | 0.46 | pass |

Sample 2 alone, with its higher value of the Polyol Ratio, passed the Hand Failure test.

I claim:

1. A moisture-reactive hot-melt adhesive composition formed by admixing components comprising a polyether polyol, a polyester polyol, a styrene/allyl alcohol copolymer, and a polyisocyanate; wherein the ratio of NCO/OH groups of said components on an equivalents basis is from 1.8/1 to 3.0/1; wherein said components contain less than 1%, by weight based on the total weight of said components, water; and wherein the free NCO content of said components is at least 4%, based on the total weight of said components.

2. The composition of claim 1, wherein the ratio of the weight of said polyether polyol to the weight of said polyester polyol is at least 0.42.

3. The composition of claim 1, wherein said polyether polyol comprises polypropylene glycol with molecular weight of between 1,000 and 3,000.

4. The composition of claim 1, wherein said polyisocyanate comprises 4,4' diphenylmethane diisocyanate.

5. The composition of claim 4 wherein the ratio of the weight of said polyether polyol to the weight of said polyester polyols is at least 0.42; and wherein said polyether polyol comprises polypropylene glycol with molecular weight of between 1,000 and 3,000.

6. A method for forming a moisture-reactive hot-melt adhesive comprising admixing components comprising a polyether polyol, a polyester polyol, a styrene/allyl alcohol copolymer, and a polyisocyanate; wherein the ratio of NCO/OH groups of said components on an equivalents basis is from 1.8/1 to 3.0/1; wherein said components contain less than 1%, by weight based on the total weight of said components, water; and wherein the free NCO content of said components is at least 4%, based on the total weight of said components.

7. The method of claim 6 wherein the ratio of the weight of said polyether polyol to the weight of said polyester polyols is at least 0.42; wherein said polyether polyol comprises polypropylene glycol with molecular weight of between 1,000 and 3,000; and wherein said polyisocyanate comprises 4,4' diphenylmethane diisocyanate.

8. A method for bonding substrates comprising
   (a) forming a moisture-reactive hot-melt adhesive by admixing components comprising a polyether polyol, a polyester polyol, a styrene/allyl alcohol copolymer, and a polyisocyanate; wherein the ratio of NCO/OH groups of said components on an equivalents basis is from 1.8/1 to 3.0/1; wherein said components contain less than 1%, by weight based on the total weight of said components, water; and wherein the free NCO content of said components is at least 4%, based on the total weight of said components;
   (b) heating said hot-melt adhesive;
   (c) applying said heated hot-melt adhesive to a first substrate in the presence of moisture;
   (d) contacting said applied heated hot-melt adhesive with a second substrate; and
   (e) cooling, or allowing to cool, said hot-melt adhesive.

9. The method of claim 8 wherein the ratio of the weight of said polyether polyol to the weight of said polyester polyols is at least 0.42; wherein said polyether polyol comprises polypropylene glycol with molecular weight of between 1,000 and 3,000; and wherein said polyisocyanate comprises 4,4' diphenylmethane diisocyanate.

* * * * *